United States Patent
Yu et al.

(10) Patent No.: US 12,311,589 B2
(45) Date of Patent: May 27, 2025

(54) ARTIFICIAL INTELLIGENCE-BASED INJECTION MOLDING SYSTEM, AND METHOD FOR CREATING MOLDING CONDITIONS

(71) Applicant: LS MTRON LTD., Anyang-si (KR)

(72) Inventors: Hyeon Jae Yu, Anyang-si (KR); Kyong Ho Park, Anyang-si (KR); Andrey Salov, Anyang-si (JP); Seung Chul Lee, Anyang-si (KR); Chi Hun Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 503 days.

(21) Appl. No.: 17/755,736

(22) PCT Filed: Nov. 3, 2020

(86) PCT No.: PCT/KR2020/015202
§ 371 (c)(1),
(2) Date: May 6, 2022

(87) PCT Pub. No.: WO2021/091191
PCT Pub. Date: May 14, 2021

(65) Prior Publication Data
US 2022/0388215 A1    Dec. 8, 2022

(30) Foreign Application Priority Data
Nov. 8, 2019 (KR) .................. 10-2019-0142773
Oct. 29, 2020 (KR) .................. 10-2020-0141748

(51) Int. Cl.
*B29C 45/76* (2006.01)
*B29C 45/03* (2006.01)
(Continued)

(52) U.S. Cl.
CPC ........... *B29C 45/766* (2013.01); *B29C 45/03* (2013.01); *B29C 45/7646* (2013.01);
(Continued)

(58) Field of Classification Search
CPC ... B29C 45/766; B29C 45/03; B29C 45/7646; B29C 45/77; B29C 45/78;
(Continued)

(56) References Cited

U.S. PATENT DOCUMENTS 5,597,588 A * 1/1997 Totani .................. B29C 45/78
425/143
2018/0203431 A1  7/2018 Stoehr et al.
(Continued)

FOREIGN PATENT DOCUMENTS

CN    108688105 A    10/2018
CN    110325342 A    10/2019
(Continued)

OTHER PUBLICATIONS

Office Action for related Chinese Application No. 202080075512.8; action dated Jun. 8, 2024; (8 pages).
(Continued)

*Primary Examiner* — Mohammad Ali
*Assistant Examiner* — Dhruvkumar Patel
(74) *Attorney, Agent, or Firm* — K&L Gates LLP

(57) ABSTRACT

An artificial intelligence-based injection molding system in which molding conditions can be changed to manufacture fair-quality products when defective products are manufactured because of disturbances during the injection molding including an injection molding machine which performs injection molding by injecting a molding material into a mold; an injection state data acquisition unit for acquiring, during injection molding, current injection state data that includes the viscosity profile of the molding material
(Continued)

injected into the mold and/or the injection pressure value thereof; a determination unit, which inputs the current injection state data into a molding quality maintenance model trained with predetermined target injection state data, so as to determine whether to maintain molding quality; and a molding condition setting unit for changing a preset molding condition so that the current injection state data follows the target injection state data, when the determination unit determines not to maintain the molding quality.

6 Claims, 6 Drawing Sheets

(51) Int. Cl.
*B29C 45/77* (2006.01)
*B29C 45/78* (2006.01)
*G05B 13/02* (2006.01)

(52) U.S. Cl.
CPC .............. *B29C 45/77* (2013.01); *B29C 45/78* (2013.01); *G05B 13/0265* (2013.01); *B29C 2945/76006* (2013.01); *B29C 2945/7605* (2013.01); *B29C 2945/76287* (2013.01); *B29C 2945/76531* (2013.01); *B29C 2945/76595* (2013.01); *B29C 2945/76668* (2013.01); *B29C 2945/76732* (2013.01)

(58) Field of Classification Search
CPC  B29C 2945/76006; B29C 2945/76545; B29C 2945/76979; B29C 45/76; B29C 2945/7604; G05B 13/0265
See application file for complete search history.

(56) References Cited

U.S. PATENT DOCUMENTS

| | | | | |
|---|---|---|---|---|
| 2019/0030775 | A1* | 1/2019 | Hsu | B29C 45/7693 |
| 2020/0094461 | A1* | 3/2020 | Okubo | B29C 31/04 |
| 2020/0198201 | A1* | 6/2020 | Shimokusuzono | B29C 45/766 |
| 2020/0202235 | A1* | 6/2020 | Chen | G06F 17/18 |
| 2020/0307055 | A1* | 10/2020 | Shimada | B29C 45/768 |

FOREIGN PATENT DOCUMENTS

| | | | |
|---|---|---|---|
| JP | 2009099364 | A | 5/2009 |
| JP | 2012035459 | A | 2/2012 |
| JP | 2015083352 | A | 4/2015 |
| JP | 2017030152 | A | 2/2017 |
| KR | 20050120783 | A | 12/2005 |
| KR | 101254188 | B1 | 4/2013 |
| KR | 20140137698 | A | 12/2014 |
| KR | 20180102315 | A | 9/2018 |
| KR | 20180108996 | A | 10/2018 |
| WO | 2018155230 | A1 | 8/2018 |
| WO | 2019051011 | A1 | 3/2019 |
| WO | 2019182145 | A1 | 9/2019 |

OTHER PUBLICATIONS

Zuqi, et al.; "Chinese glass steel industry disctionary"; National Defense Industry Press; 1992; (8 pages).
Haneda; "Thermoplastics and Injection Moulding Thereof"; Chemical Industry Press, Beijing; 1999; (7 pages).
International Search Report for related International Application No. PCT/KR2020/015202; action dated May 14, 2021; (5 pages).
Written Opinion for related International Application No. PCT/KR2020/015202; action dated May 14, 2021; (4 pages).
Office Action for related Chinese Application No. 202080075512.8; action dated Oct. 31, 2023; (7 pages).
Office Action for related Japanese Application No. 2022-520141; action dated Jan. 27, 2023; (4 pages).
Supplementary Search Report for related European Application No. 20885901.7; action dated Oct. 31, 2023; (7 pages).
S. L. Mok, et al.; "Review of Research in the Determination of Process Parameters for Plastic Injection Molding"; Mar. 30, 1999; Hong Kong Technical College; (12 pages).
Fara, et al; "Neural Network Control for Cavity Pressure During Filling and Packing Stages of the Thermoplastics Injection Molding Process"; Journal of Injection Molding Technology; vol. 5, No. 2; Jun. 2001; (15 pages).
Liang, et al.; "Self-Learning Control for Injection Molding Based on Neural Networks Optimization"; Journal of Injection Molding Technology; vol. 6, No. 1; Mar. 2002; (14 pages).

* cited by examiner

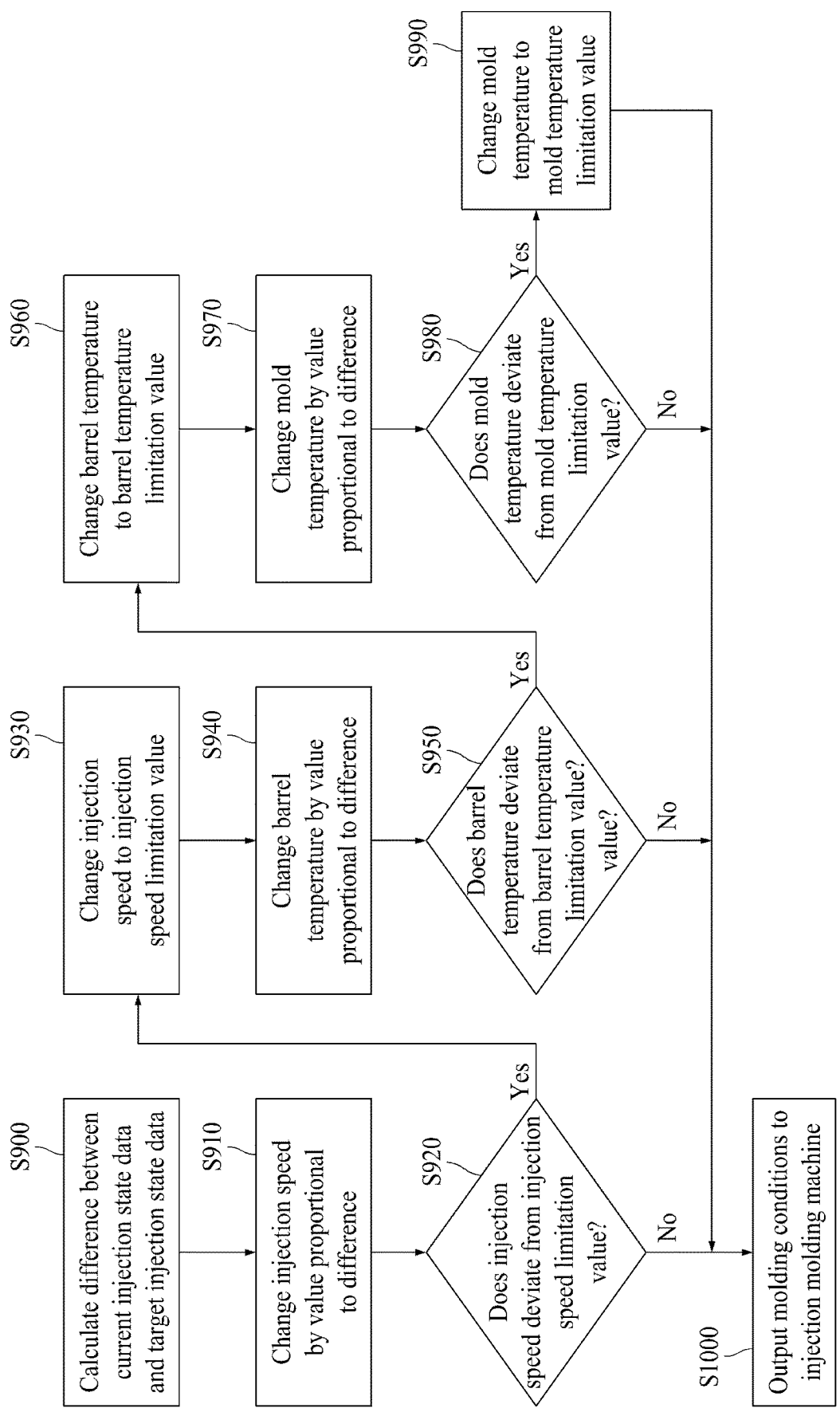

ARTIFICIAL INTELLIGENCE-BASED INJECTION MOLDING SYSTEM, AND METHOD FOR CREATING MOLDING CONDITIONS

CROSS-REFERENCE TO RELATED APPLICATIONS

The present application is a National Stage of International Application No. PCT/KR2020/015202 filed on Nov. 3, 2020, which claims the benefit of Korean Patent Application No. 10-2019-0142773, filed on Nov. 8, 2019; and Korean Patent Application No. 10-2020-0141748, filed on Oct. 29, 2020 with the Korean Intellectual Property Office, the entire contents of each hereby incorporated by reference.

FIELD

The present disclosure relates to an injection molding system, and more particularly, to control of an injection molding system.

BACKGROUND

Injection molding is a manufacturing method that is most widely used in manufacturing plastic products. For example, in products including televisions, portable phones, personal digital assistants (PDAs), etc., various parts including covers and cases may be manufactured through injection molding.

In general, product manufacturing through injection molding is performed through the following processes. First, a molding material containing a pigment, a stabilizer, a plasticizer, a filler, etc. is put into a hopper to make the molding material molten. Subsequently, the molding material in a melted state is injected into a mold and then solidified by cooling. Subsequently, the solidified molding material is extracted from the mold, and then unnecessary portions are removed. Through these processes, various types of products having various sizes are manufactured.

As equipment for performing such injection molding, an injection molding machine is used. The injection molding machine includes an injection device that supplies a molding material in a melted state and a shaping device that solidifies the molding material in the melted state by cooling.

To manufacture a product through an injection molding machine, various molding conditions, such as temperature, speed, pressure, time, etc., should be appropriately set, and then high-quality products may be manufactured. However, even when injection molding is performed under appropriate molding conditions, high-quality products may not be manufactured due to a disturbance, such as a change in ambient temperature/humidity, a change in the properties of a molding material, etc., during the injection molding.

Accordingly, in order to manufacture products of consistent quality, it is necessary to change molding conditions according to surroundings, changes in the properties of a molding material, etc. However, when operators change molding conditions, each operator may set the molding conditions differently even in the case of the same disturbance, and thus it is difficult to expect consistent molding quality.

SUMMARY

Therefore, the present disclosure is designed to solve these problems and is for providing an artificial intelligence (AI)-based injection molding system capable of changing a molding condition to manufacture good-quality products when defective products are manufactured due to a disturbance during injection molding for products.

The present disclosure is for providing an AI-based injection molding system capable of setting molding conditions for maintaining good molding quality using a deep-learning-based molding quality maintenance model.

One aspect of the present disclosure provides an artificial intelligence (AI)-based injection molding system including: an injection molding machine (100) configured to inject a molding material into a mold and perform injection molding for a product; an injection state data acquisition unit (710) configured to acquire, during the injection molding for the product, current injection state data including at least one of a viscosity profile of the molding material injected into the mold and an injection pressure value thereof; a determination unit (720) configured to input the current injection state data into a molding quality maintenance model (735) trained with predetermined target injection state data and determine whether molding quality is maintained; and a molding condition setting unit (730) configured to change, when the determination unit (720) determines that the molding quality is not maintained, preset molding conditions so that the current injection state data follows the target injection state data.

Another aspect of the present disclosure provides a method of generating molding conditions in an AI-based injection molding system, the method including: when a molding material is injected into a mold and injection molding is performed for a product, acquiring current injection state data including at least one of a viscosity profile of the molding material injected into the mold and an injection pressure value thereof; inputting the current injection state data into a molding quality maintenance model (735), which is trained with target injection state data including at least one of a target viscosity profile and a target injection pressure measured during injection molding for a good-quality product to determine whether molding quality is maintained; and when it is determined that the molding quality is not maintained, changing preset molding conditions so that the current injection state data follows the target injection state data.

According to the present disclosure, when defective products are manufactured due to a disturbance during injection molding for products, a molding condition generation device implemented as a deep-learning-based neural network can automatically change a molding condition such that the quality of products can be improved.

Also, according to the present disclosure, a molding condition is automatically changed by a molding condition generation device. Consequently, it is possible to change a molding condition to a good-quality condition within a short time even without an experienced expert.

BRIEF DESCRIPTION OF THE DRAWINGS

FIG. 7 is a flowchart illustrating a method of changing molding conditions according to an embodiment of the present disclosure.

DETAILED DESCRIPTION

Hereinafter, embodiments of the present disclosure will be described in detail with reference to the accompanying drawings.

Figure 1:
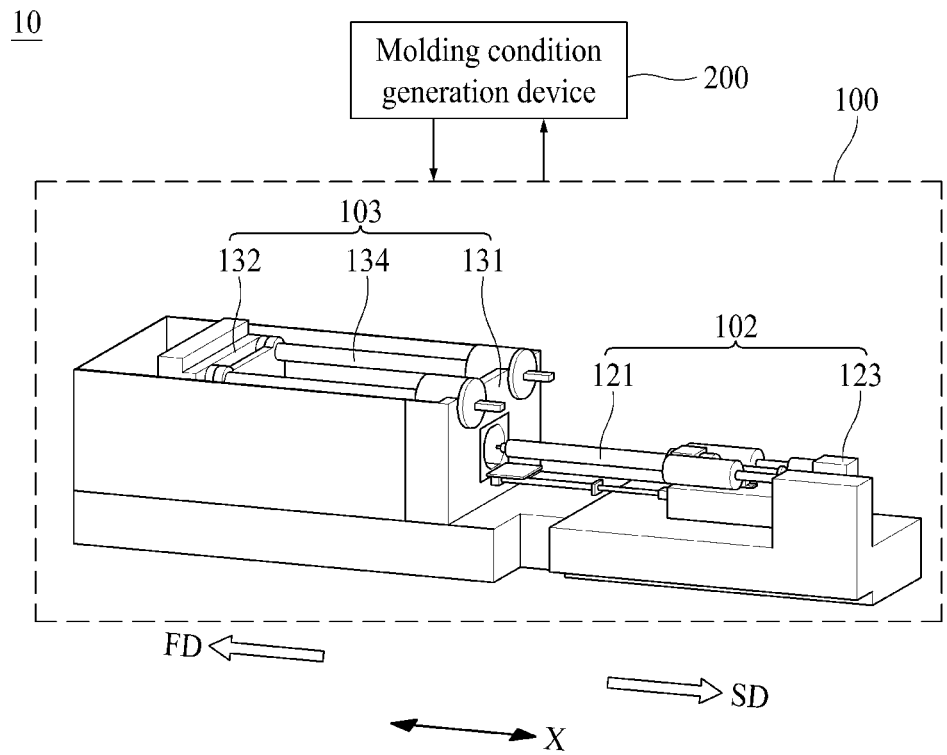
FIG. 1 is a diagram of an artificial intelligence (AI)-based injection molding system according to an embodiment of the present disclosure.

FIG. 1 is a diagram of an artificial intelligence (AI)-based injection molding system according to an embodiment of the present disclosure.

An AI-based injection molding system 10 (hereinafter "injection molding system") according to the present disclosure manufactures a product using a molding material according to an optimal molding condition. To this end, as shown in FIG. 1, the injection molding system 10 includes an injection molding machine 100 and a molding condition generation device 200.

The injection molding machine 100 performs injection molding to manufacture products.

Figure 2:
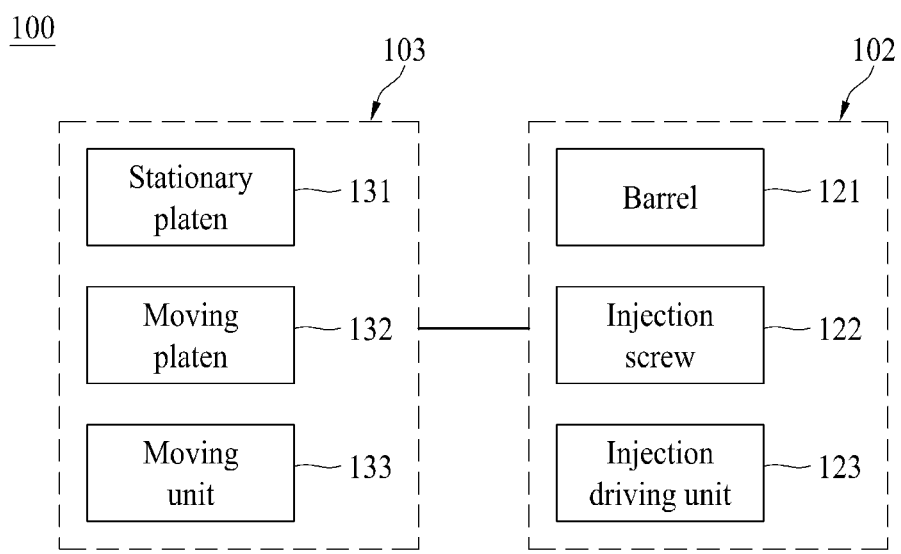
FIG. 2 is a diagram showing a configuration of an injection molding machine according to an embodiment of the present disclosure.

FIG. 2 is a diagram showing a configuration of the injection molding machine 100 according to an embodiment of the present disclosure. Referring to FIGS. 1 and 2, the injection molding machine 100 will be described in detail.

As shown in FIGS. 1 and 2, the injection molding machine 100 according to the present disclosure includes an injection device 102 and a shaping device 103.

The injection device 102 supplies a molding material in a melted state to the shaping device 103. The injection device 102 may include a barrel 121, an injection screw 122 disposed in the barrel 121, and an injection driving unit 123 for driving the injection screw 122. The barrel 121 may be disposed in parallel with a first axis direction (X-axis direction). The first axis direction (X-axis direction) may be a direction parallel to a direction in which the injection device 102 and the shaping device 103 are spaced apart from each other. When a molding material is supplied into the barrel 121, the injection driving unit 123 may move the molding material supplied into the barrel 121 in a first direction (FD arrow direction) by rotating the injection screw 122. In this process, the molding material may be melted by friction and heating. The first direction (FD arrow direction) may be a direction from the injection device 102 toward the shaping device 103 and may be a direction parallel to the first axis direction (X-axis direction). When the molding material in the melted state is in the first direction (FD arrow direction) from the injection screw 122, the injection driving unit 123 may move the injection screw 122 in the first direction (FD arrow direction). Accordingly, the molding material in the melted state may be supplied from the barrel 121 to the shaping device 103.

The shaping device 103 solidifies the molding material in the melted state by cooling. The shaping device 103 may include a stationary platen 131 to which a fixed mold 150 is coupled, a moving platen 132 to which a moving mold 160 is coupled, and a moving unit 133 that moves the moving platen 132 in the first axis direction (X-axis direction).

Figure 3:
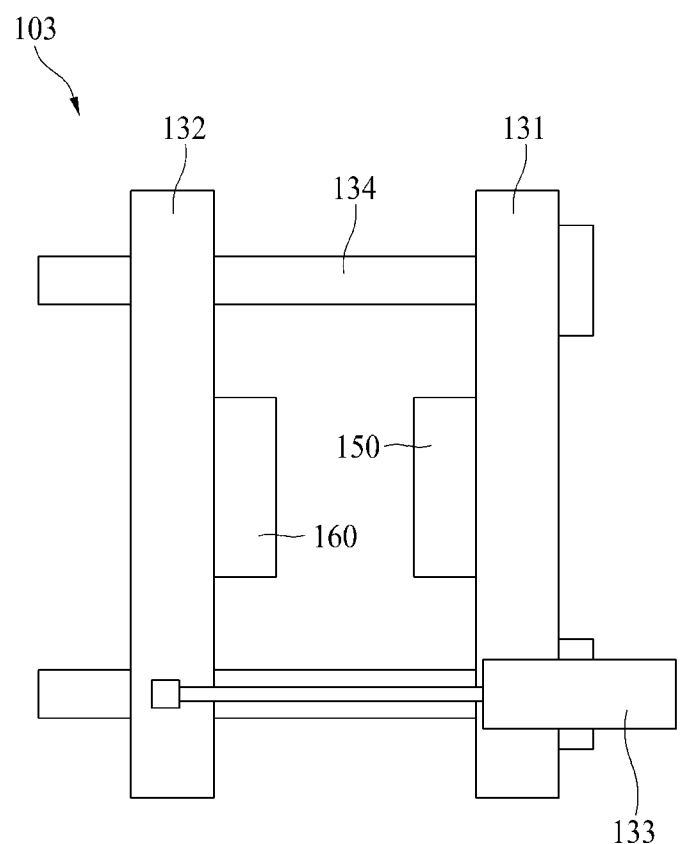
FIG. 3 is a diagram showing a fixed mold and a moving mold that are open.
Figure 4:
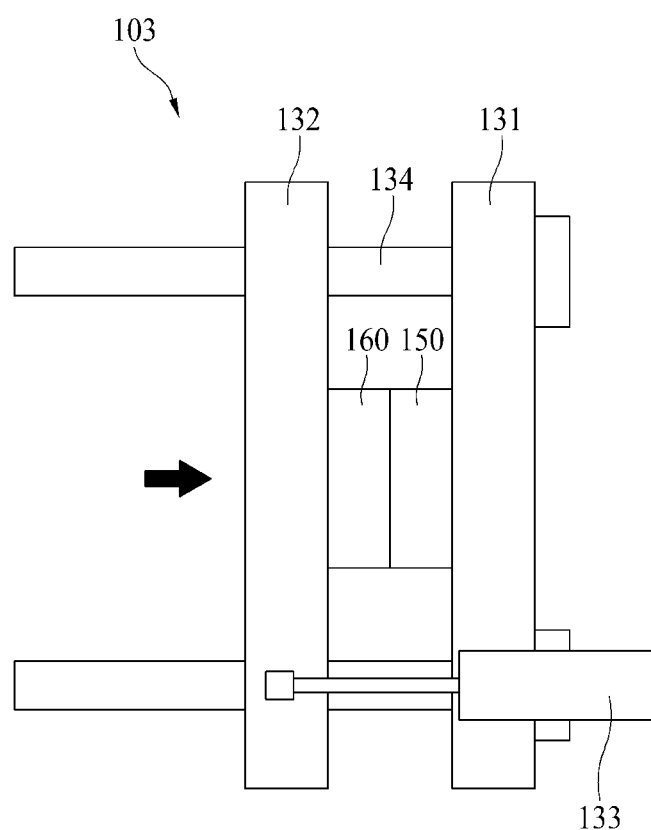
FIG. 4 is a diagram showing the fixed mold and the moving mold that are closed by a moving unit.

FIGS. 3 and 4 are diagrams illustrating an operation of the moving unit closing the fixed mold and the moving mold.

When the moving unit 133 closes the moving mold 160 and the fixed mold 150 by moving the moving platen 132 in a second direction (SD arrow direction), the injection device 102 supplies a molding material in a melted state into the moving mold 160 and the fixed mold 150. The second direction (SD arrow direction) is a direction that is parallel to the first axis direction (X-axis direction) and opposite to the first direction (FD arrow direction). Subsequently, when the shaping device 103 solidifies the molding material in the melted state, with which the moving mold 160 and the fixed mold 150 are filled, by cooling, the moving unit 133 opens the moving mold 160 and the fixed mold 150 by moving the moving platen 132 in the first direction (FD arrow direction).

The shaping device 103 may include a tie bar 134. The tie bar 134 guides movement of the moving platen 132. The moving platen 132 may be movably coupled to the tie bar 134. The moving platen 132 may move in the first axis direction (X-axis direction) along the tie bar 134. The tie bar 134 may be disposed in parallel with the first axis direction (X-axis direction). The tie bar 134 may be inserted into and coupled to each of the stationary platen 131 and the moving platen 132.

Meanwhile, the injection molding machine 100 according to the present disclosure manufactures a product by supplying a molding material to the closed moving mold 160 and fixed mold 150 according to a molding condition generated by the molding condition generation device 200. The moving mold 160 and the fixed mold 150 are referred to below as the "mold."

The molding condition generation device 200 generates and transmits a molding condition to the injection molding machine 100. To generate an optimal molding condition, the molding condition generation device 200 determines whether the molding condition is appropriate based on a product manufactured under the molding condition.

The molding condition generation device 200 according to the present disclosure will be described in further detail below with reference to FIG. 5.

Figure 5:
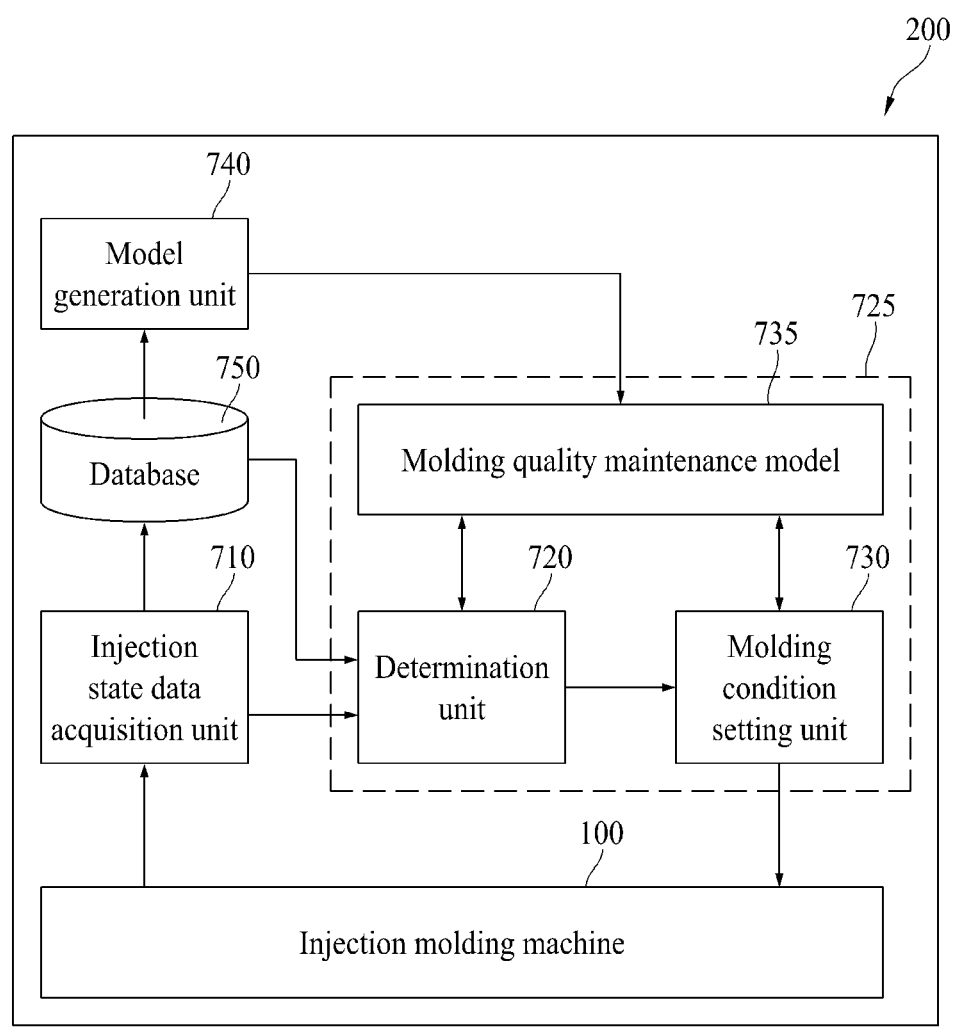
FIG. 5 is a diagram illustrating a configuration of a molding condition generation device according to an embodiment of the present disclosure.

FIG. 5 is a diagram illustrating a configuration of a molding condition generation device according to an embodiment of the present disclosure. As shown in FIG. 5, the molding condition generation device 200 includes an injection state data acquisition unit 710, a determination unit 720, a molding condition setting unit 730, and a molding quality maintenance model 735. In FIG. 5, the determination unit 720, the molding condition setting unit 730, and the molding quality maintenance model 735 are shown as separate elements. However, this is only an example, and the determination unit 720 and the molding condition setting unit 730 may be implemented as one engine 725 in the form of software. Also, the molding condition generation device 200 may additionally include a model generation unit 740 and a database 750 as shown in FIG. 5.

The injection state data acquisition unit 710 acquires injection state data from the injection molding machine 100 while the injection molding machine 100 performs injection molding for a product. According to an embodiment, the injection state data may include at least one of a viscosity profile and an injection pressure value of a molding material injected into a mold. Here, the viscosity profile of the molding material may be calculated on the basis of the thickness of an injection product and a pressure variation in the mold over time.

For example, the injection state data acquisition unit 710 may calculate the viscosity profile of the molding material using Equation 1 below.

$$\eta = \frac{\sigma_w}{\gamma_w} = \frac{\frac{\Delta PH}{2L}}{\frac{6L}{H\Delta t}} = \frac{H^2 \Delta P \Delta t}{12L^2} \quad \text{[Equation 1]}$$

In Equation 1, η denotes a viscosity, $\sigma_W$ denotes a wall shear stress, and $\gamma_W$ denotes a wall shear rate. Also, H denotes the thickness of the injection product, L denotes a flow distance defined as the distance between a pressure sensor and a temperature sensor (or the distance between two pressure sensors), ΔP denotes a pressure variation, and Δt denotes a time variation. Here, the pressure variation is the amount that pressure changes during the flow corresponding to the flow distance L, and the time variation is the time for the flow corresponding to the flow distance L.

To this end, while an injection operation is being performed by the injection molding machine 100, the injection state data acquisition unit 710 may measure a pressure variation in the mold over time or measure an injection pressure. The injection state data acquisition unit 710 calculates the viscosity profile of the molding material using the measured time variation, pressure variation, thickness of the injection product, and flow distance.

At predetermined points in time or every time an injection state data acquisition request is received from the determination unit 720, the injection state data acquisition unit 710 may acquire injection molding data from the injection molding machine 100 and provide the injection molding data to the determination unit 720. Injection state data acquired at predetermined points in time or every time an injection state data acquisition request is received will be referred to below as current injection state data.

Meanwhile, when a product generated by the injection molding machine 100 in the past is of good quality that satisfies a predetermined condition, the injection state data acquisition unit 710 may determine injection state data acquired during the injection molding for the product as target injection state data and store the determined target injection state data in the database 750. The target injection state data may include at least one of a target viscosity profile and a target injection pressure value. When the manufactured product is of good quality that satisfies the predetermined condition, the target viscosity profile may be calculated on the basis of a time variation, a pressure variation, the thickness of the injection product, and a flow distance which are measured during injection molding for the product.

The determination unit 720 determines whether a product molded under predetermined molding conditions maintains the same quality using the current injection state data acquired by the injection state data acquisition unit 710. The predetermined molding conditions may be initial molding conditions which are set by the molding condition setting unit 730 for an initial operation, and the initial molding conditions may be molding conditions acquired when good-quality products are manufactured.

According to an embodiment, the determination unit 720 may determine whether molding quality is maintained by inputting the current injection state data acquired by the injection state data acquisition unit 710 into the molding quality maintenance model 735. The molding quality maintenance model 735 may be a deep-learning-based neural network that is trained with the target injection state data, and when it is determined that the input current injection state data deviates from a threshold range set on the basis of the target injection state data, the molding quality maintenance model 735 may determine that molding quality is not maintained.

The molding condition setting unit 730 sets the initial molding conditions which will apply to an initial operation of the injection molding machine 100 and outputs the initial molding conditions to the injection molding machine 100. According to an embodiment, the initial molding conditions may include at least one of a temperature and pressure in the mold, an injection pressure, a barrel temperature, an injection speed, a packing time, and a packing pressure. As described above, the initial molding conditions may be the molding conditions acquired when good-quality products are manufactured.

In particular, the molding condition setting unit 730 according to the present disclosure may change molding conditions applied to the injection molding machine 100 according to a determination result of the determination unit 720 on whether molding quality is maintained. When the determination unit 720 determines that molding quality is maintained, the molding condition setting unit 730 determines to maintain the currently set molding conditions. On the other hand, when the determination unit 720 determines that molding quality is not maintained, the molding condition setting unit 730 changes molding conditions so that the current injection state data acquired by the injection state data acquisition unit 710 may follow the target injection state data.

According to an embodiment, the molding condition setting unit 730 may change at least one of the injection speed, the barrel temperature, and the mold temperature among the molding conditions. The molding condition setting unit 730 may first change a molding condition that can be applied easily and rapidly among the injection speed, the barrel temperature, and the mold temperature. For example, the injection speed is a molding condition that can be immediately changed, and thus the molding condition setting unit 730 may determine to change the injection speed first of all. The barrel temperature can be controlled but takes a longer application time than the injection speed, and thus the molding condition setting unit 730 may determine to change the barrel temperature after changing the injection speed. Also, the mold temperature can be controlled but is not a direct element of the injection molding machine 100, and thus the application time is the longest. Accordingly, the molding condition setting unit 730 may determine to change the mold temperature after changing the barrel temperature.

Specifically, when the determination unit 720 determines that molding quality is not maintained, the molding condition setting unit 730 may use the molding quality maintenance model 735 to calculate the difference between the current injection state data and the target injection state data and changes the injection speed by a value proportional to the difference so that the current injection state data follows the target injection state data.

As an example, when the determination unit 720 determines that molding quality is not maintained, the molding condition setting unit 730 uses the molding quality maintenance model 735 to calculate the difference between a current viscosity profile and the target viscosity profile and then changes the injection speed by a value proportional to the difference so that the current viscosity profile follows the target viscosity profile.

When a viscosity profile value is large, the viscosity is high, indicating that the molding material does not flow well. Accordingly, when the current viscosity profile is greater than the target viscosity profile, the injection speed may be increased or the barrel temperature or the mold temperature may be increased to lower the viscosity profile value such that the molding material may flow well.

As another example, when the determination unit 720 determines that molding quality is not maintained, the molding condition setting unit 730 uses the molding quality maintenance model 735 to calculate the difference between a current injection pressure value and the target injection pressure value and then changes the injection speed by a value proportional to the difference so that the current injection pressure value follows the target injection pressure value.

When the injection speed is changed using the value proportional to the difference, the molding condition setting unit 730 changes the injection speed within a predetermined injection speed limitation value.

When the injection speed is changed by the value proportional to the difference and then deviates from the injection speed limitation value, the molding condition setting unit 730 uses the molding quality maintenance model 735 to change the injection speed to the injection speed limitation value and changes the barrel temperature by a value proportional to the difference so that the current injection state data follows the target injection state data.

As an example, when the determination unit 720 determines that molding quality is not maintained, the molding condition setting unit 730 uses the molding quality maintenance model 735 to calculate the difference between the current viscosity profile and the target viscosity profile, changes the injection speed to the injection speed limitation value, and changes the barrel temperature by a value proportional to the difference so that the current viscosity profile follows the target viscosity profile.

As another example, when the determination unit 720 determines that molding quality is not maintained, the molding condition setting unit 730 uses the molding quality maintenance model 735 to calculate the difference between the current injection pressure value and the target injection pressure value, changes the injection speed to the injection speed limitation value, and changes the barrel temperature by a value proportional to the difference so that the current injection pressure value follows the target injection pressure value.

When the barrel temperature is changed using the value proportional to the difference, the molding condition setting unit 730 changes the barrel temperature within a predetermined barrel temperature limitation value.

At this time, the molding condition setting unit 730 may change the barrel temperature by the value proportional to the difference except for a difference that applies when the injection speed is changed to the injection speed limitation value.

When the barrel temperature is changed by the value proportional to the difference and then deviates from the barrel temperature limitation value, the molding condition setting unit 730 uses the molding quality maintenance model 735 to change the barrel temperature to the barrel temperature limitation value and changes the mold temperature by a value proportional to the difference so that the current injection state data follows the target injection state data.

As an example, when the determination unit 720 determines that molding quality is not maintained, the molding condition setting unit 730 uses the molding quality maintenance model 735 to calculate the difference between the current viscosity profile and the target viscosity profile, changes the injection speed to the injection speed limitation value, changes the barrel temperature to the barrel temperature limitation value, and changes the mold temperature by a value proportional to the difference so that the current viscosity profile follows the target viscosity profile.

As another example, when the determination unit 720 determines that molding quality is not maintained, the molding condition setting unit 730 uses the molding quality maintenance model 735 to calculate the difference between the current injection pressure value and the target injection pressure value, changes the injection speed to the injection speed limitation value, changes the barrel temperature to the barrel temperature limitation value, and changes the mold temperature by a value proportional to the difference so that the current injection pressure value follows the target injection pressure value.

When the barrel temperature is changed using the value proportional to the difference, the molding condition setting unit 730 changes the mold temperature within a predetermined mold temperature limitation value.

At this time, the molding condition setting unit 730 may change the mold temperature by the value proportional to the difference except for a difference that applies when the injection speed is changed to the injection speed limitation value and a difference that applies when the barrel temperature is changed to the barrel temperature limitation value.

When the mold temperature is changed by the value proportional to the difference and then deviates from the mold temperature limitation value, the molding condition setting unit 730 changes the mold temperature to the mold temperature limitation value.

Meanwhile, when the mold temperature is changed by the value proportional to the difference and then deviates from the mold temperature limitation value, the molding condition generation device 200 may determine that it is difficult to maintain molding quality and raise an alarm to operators.

As described above, when there is a difference between current injection state data and target injection state data, the molding condition setting unit 730 sequentially changes the injection speed, the barrel temperature, and the mold temperature so that the current injection state data follows the target injection state data. Even when a disturbance occurs during an injection operation, the quality of a product manufactured through injection can be maintained at the same level as good-quality products.

Also, according to the present disclosure, molding conditions are changed not by the experience of an operator but by using the molding quality maintenance model 735 configured as a deep-learning-based neural network. Therefore, molding quality can be kept constant regardless of the skill level of the operator.

The molding condition setting unit 730 outputs the changed molding conditions to the injection molding machine 100. Accordingly, the injection molding machine 100 performs injection molding under the changed molding conditions, thereby producing a product.

When the current injection state data is input by the injection state data acquisition unit 710, the molding quality maintenance model 735 determines whether molding quality is maintained on the basis of the current injection state data and the target injection state data. The molding quality maintenance model 735 may be trained by the model generation unit 740. According to an embodiment, the molding quality maintenance model 735 may be a deep-learning-based neural network for determining whether molding quality is maintained on the basis of a plurality of weights and a plurality of biases. According to this embodiment, the molding quality maintenance model 735 may be implemented as an artificial neural network (ANN) algorithm.

The model generation unit 740 generates the molding quality maintenance model 735 and trains the generated molding quality maintenance model 735. Specifically, the model generation unit 740 may generate the molding quality maintenance model 735 by training a neural network using a plurality of pieces of target injection state data as a training dataset.

Specifically, the model generation unit 740 generates a plurality of training datasets using at least one of target viscosity profiles and target injection pressure values which are acquired during the production of good-quality products and generates the molding quality maintenance model 735 by training the neural network with the generated plurality of training datasets.

Also, when new target injection state data is generated at regular intervals, the model generation unit 740 may train the molding quality maintenance model 735 with the new target injection state data.

As described above, according to the present disclosure, the molding quality maintenance model 735 generated by the model generation unit 740 can induce the operator to determine whether molding quality is maintained and change molding conditions to maintain molding quality even without professional knowledge about injection molding. Accordingly, dependency on experts in injection molding decreases, and thus it is possible to build a smart factory in the injection field on the basis of an unmanned injection molding system.

In the database 750, the current injection state data and the target injection state data generated by the injection state data acquisition unit 710 may be stored. Also, molding conditions set or changed by the molding condition setting unit 730 may be stored in the database 750. In addition, various pieces of information used in injection molding may be stored in the database 750.

Figure 6:
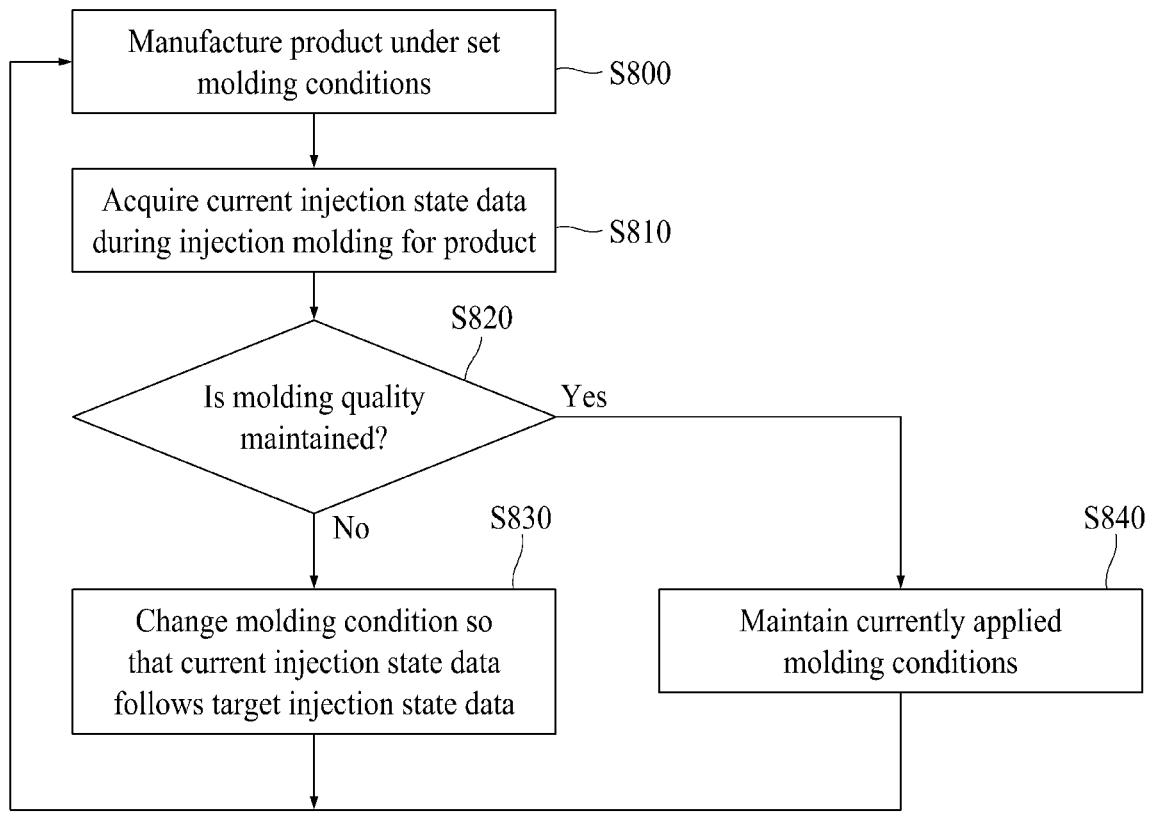
FIG. 6 is a flowchart illustrating a method of generating molding conditions according to an embodiment of the present disclosure.

A method of generating molding conditions in an injection molding system according to the present disclosure will be described in detail below with reference to FIG. 6. FIG. 6 is a flowchart illustrating a method of generating molding conditions according to an embodiment of the present disclosure. The method of generating molding conditions in an injection molding system illustrated in FIG. 6 may be performed by the injection molding system shown in FIG. 1.

The injection molding machine 100 generates a product under molding conditions set by the molding condition generation device 200 (S800). According to an embodiment, the injection molding machine may set molding conditions applied during production of good-quality products as initial molding conditions.

While injection molding for a product is underway by the injection molding machine 100, the molding condition generation device 200 acquires current injection state data including at least one of a current viscosity profile and a current injection pressure value of a molding material injected into a mold in the injection molding machine 100 (S810).

According to an embodiment, the current viscosity profile may be calculated using a time variation, a pressure variation, the thickness of the injection product, and a flow distance during injection molding for the product.

Subsequently, the molding condition generation device 200 determines whether molding quality is maintained on the basis of current injection molding data and target injection molding data (S820). Here, the target injection molding data is injection state data acquired while good-quality products are being manufactured. According to an embodiment, the molding condition generation device 200 may determine whether molding quality is maintained by inputting the current injection state data to a molding quality maintenance model trained with the target injection state data.

Specifically, when the molding quality maintenance model determines that the current injection state data deviates from a threshold range set on the basis of the target injection state data, the molding condition generation device 200 determines that molding quality is not maintained, and when the molding quality maintenance model determines that the current injection state data does not deviate from the threshold range, the molding condition generation device 200 determines that molding quality is maintained.

When it is determined in operation S820 that molding quality is not maintained, the molding condition generation device 200 changes a preset molding condition so that the current injection state data follows the target injection state data (S830). According to an embodiment, the molding condition generation device 200 may change at least one of an injection speed, a barrel temperature, and a mold temperature.

Since the changed molding condition is output to the injection molding machine 100 by the molding condition generation device 200, the injection molding machine 100 performs injection molding under the changed molding condition (S800).

Meanwhile, when it is determined in operation S820 that molding quality is maintained, the molding condition generation device 200 determines to maintain the currently applied molding conditions (S840).

Since it is determined by the molding condition generation device 200 to maintain the molding conditions, the injection molding machine 100 performs injection molding under the applied molding conditions (S800).

A process in which a molding condition generation device changes molding conditions will be described in further detail below with reference to FIG. 7. FIG. 7 is a flowchart illustrating a method in which a molding condition generation device changes molding conditions according to an embodiment of the present disclosure. The process illustrated in FIG. 7 is performed by the molding condition generation device 200, and the molding condition generation device 200 may perform the process illustrated in FIG. 7 using a molding quality maintenance model.

First, when it is determined in operation S820 illustrated in FIG. 6 that molding quality is not maintained, the molding condition generation device 200 calculates a difference between the current injection state data and the target injection state data (S900).

The molding condition generation device 200 changes the injection speed by a value proportional to the difference (S910).

The molding condition generation device 200 determines whether the changed injection speed deviates from an injection speed limitation value (S920).

When it is determined in operation S920 that the changed injection speed does not deviate from the injection speed limitation value, the molding condition generation device 200 outputs changed molding conditions including the changed injection speed to the injection molding machine 100 (S1000).

Meanwhile, when it is determined in operation S920 that the changed injection speed deviates from the injection speed limitation value, the molding condition generation device 200 changes an injection speed to the injection speed limitation value (S930) and changes a barrel temperature by a value proportional to the difference (S940). In this case, the barrel temperature may be changed by the value proportional to the difference except for a difference that applies when the injection speed is changed to the injection speed limitation value.

The molding condition generation device 200 determines whether the changed barrel temperature deviates from a barrel temperature limitation value (S950).

When it is determined in operation S950 that the changed barrel temperature does not deviate from the barrel temperature limitation value, the molding condition generation device 200 outputs changed molding conditions including the changed injection speed (the injection speed limitation value) and the changed barrel temperature to the injection molding machine 100 (S1000).

Meanwhile, when it is determined in operation S950 that the changed barrel temperature deviates from the barrel temperature limitation value, the molding condition generation device 200 changes the barrel temperature to the barrel temperature limitation value (S960) and changes a mold temperature by a value proportional to the difference (S970). In this case, the mold temperature may be changed by the value proportional to the difference except for a difference that applies when the injection speed is changed to the injection speed limitation value and a difference that applies when the barrel temperature is changed to the barrel temperature limitation value.

The molding condition generation device 200 determines whether the changed mold temperature deviates from a mold temperature limitation value (S980).

When it is determined in operation S980 that the changed mold temperature does not deviate from the mold temperature limitation value, the molding condition generation device 200 outputs changed molding conditions including the changed injection speed (the injection speed limitation value), the changed barrel temperature (the barrel temperature limitation value), and the changed mold temperature to the injection molding machine 100 (S1000).

Meanwhile, when it is determined in operation S950 that the changed mold temperature deviates from the mold temperature limitation value, the molding condition generation device 200 changes the mold temperature to the mold temperature limitation value (S990) and outputs changed molding conditions including the changed injection speed (the injection speed limitation value), the changed barrel temperature (the barrel temperature limitation value), and the changed mold temperature (the mold temperature limitation value) to the injection molding machine 100 (S1000).

Meanwhile, when it is determined that the changed mold temperature deviates from the mold temperature limitation value, the molding condition generation device 200 may determine that it is difficult to maintain molding quality and raise an alarm to operators.

Those of ordinary skill in the art should understand that the present disclosure can be implemented in other specific forms without changing the technical spirit or necessary characteristics of the present disclosure.

Also, the methods described herein can be implemented at least partially using one or more computer programs or components. These components may be provided as a series of computer instructions on any computer-readable medium or machine-readable medium including a volatile or non-volatile memory. The instructions may be provided as software or firmware and may be implemented in whole or in part in hardware components such as application specific integrated circuits (ASICs), field programmable gate arrays (FPGAs), digital signal processors (DSPs), or other similar devices. The instructions may be configured to be executed by one or more processors or other hardware components, which, when executing the series of computer instructions, perform or make it possible to perform all or some of the methods and procedures disclosed herein.

Therefore, it should be understood that the above-described embodiments are illustrative in all aspects and are not limitative. The scope of the present disclosure is defined by the following claims rather than the detailed descriptions, and it should be interpreted that all changes or modifications derived from the meanings and scope of the claims and the equivalents thereto fall within the scope of the present disclosure.

The invention claimed is:

1. An artificial intelligence (AI)-based injection molding system comprising:
    an injection molding machine configured to inject a molding material into a mold and perform injection molding for a product;
    an injection state data acquisition unit configured to acquire, during the injection molding for the product, current injection state data including at least one of a viscosity profile and an injection pressure value of the molding material injected into the mold;
    a determination unit configured to input the current injection state data into a molding quality maintenance model trained with target injection state data and determine whether molding quality is maintained; and
    a molding condition setting unit configured to change, when the determination unit determines that the molding quality is not maintained, preset molding conditions so that the current injection state data follows the target injection state data;
    wherein:
        the molding condition setting unit changes at least one of an injection speed, a barrel temperature, and a mold temperature among the molding conditions,
        when the determination unit determines that the molding quality is not maintained, the molding condition setting unit calculates a difference between the current injection state data and the target injection state data and changes the injection speed by a value proportional to the difference within a predetermined injection speed limitation value so that the current injection state data follows the target injection state data,
        when the injection speed is changed by the value proportional to the difference and then deviates from the injection speed limitation value, the molding condition setting unit changes the injection speed to the injection speed limitation value and changes the barrel temperature by a value proportional to the difference within a predetermined barrel temperature limitation value,
        when the barrel temperature is changed by the value proportional to the difference and then deviates from the barrel temperature limitation value, the molding condition setting unit changes the barrel temperature to the barrel temperature limitation value and changes the mold temperature by a value proportional to the difference within a predetermined mold temperature limitation value, and
        when the mold temperature is changed by the value proportional to the difference and then deviates from the mold temperature limitation value, the molding condition setting unit changes the mold temperature to the mold temperature limitation value.

2. The AI-based injection molding system of claim 1, wherein the injection state data acquisition unit acquires the viscosity profile using a thickness of the product and a pressure variation in the mold over time.

3. The AI-based injection molding system of claim 1, wherein the target injection state data includes at least one of a target viscosity profile acquired during injection molding for a good-quality product and a target injection pressure value measured during the injection molding for the good-quality product.

4. The AI-based injection molding system of claim 1, wherein, when it is determined that the current injection state data deviates from a threshold range which is set based on the target injection state data, the determination unit determines that the molding quality is not maintained.

5. The AI-based injection molding system of claim 1, further comprising a model generation unit configured to train a neural network with the target injection state data, which includes at least one of a plurality of target viscosity profiles and a plurality of target injection pressure values measured during injection molding for fair-quality products, and generate the molding quality maintenance model.

6. A method of generating molding conditions in an artificial intelligence (AI)-based injection molding system, the method comprising:
when a molding material is injected into a mold and injection molding is performed for a product, acquiring current injection state data including at least one of a viscosity profile and an injection pressure value of the molding material injected into the mold;
inputting the current injection state data into a molding quality maintenance model, which is trained with target injection state data including at least one of a target viscosity profile and a target injection pressure measured during injection molding for a good-quality product, to determine whether molding quality is maintained; and
when it is determined that the molding quality is not maintained, changing preset molding conditions so that the current injection state data follows the target injection state data,
wherein the changing of the preset molding conditions comprises changing at least one of an injection speed, a barrel temperature, and a mold temperature among the molding conditions,
wherein the changing of the preset molding conditions comprises, when it is determined that the molding quality is not maintained, calculating a difference between the current injection state data and the target injection state data and changing the injection speed by a value proportional to the difference within a predetermined injection speed limitation value,
wherein the changing of the preset molding conditions further comprises, when it is determined that the injection speed is changed by the value proportional to the difference and then deviates from the injection speed limitation value, changing the injection speed to the injection speed limitation value and changing the barrel temperature by a value proportional to the difference within a predetermined barrel temperature limitation value,
wherein the changing of the preset molding conditions further comprises, when it is determined that the barrel temperature is changed by the value proportional to the difference and then deviates from the barrel temperature limitation value, changing the barrel temperature to the barrel temperature limitation value and changing the mold temperature by a value proportional to the difference within a predetermined mold temperature limitation value,
wherein the changing of the preset molding conditions further comprises, when it is determined that the mold temperature is changed by the value proportional to the difference and then deviates from the mold temperature limitation value, changing the mold temperature to the mold temperature limitation value.

* * * * *